April 18, 1944.  A. O. GROOMS  2,346,836
ELECTRICAL CONTROL MEANS
Filed Nov. 30, 1940    2 Sheets-Sheet 2
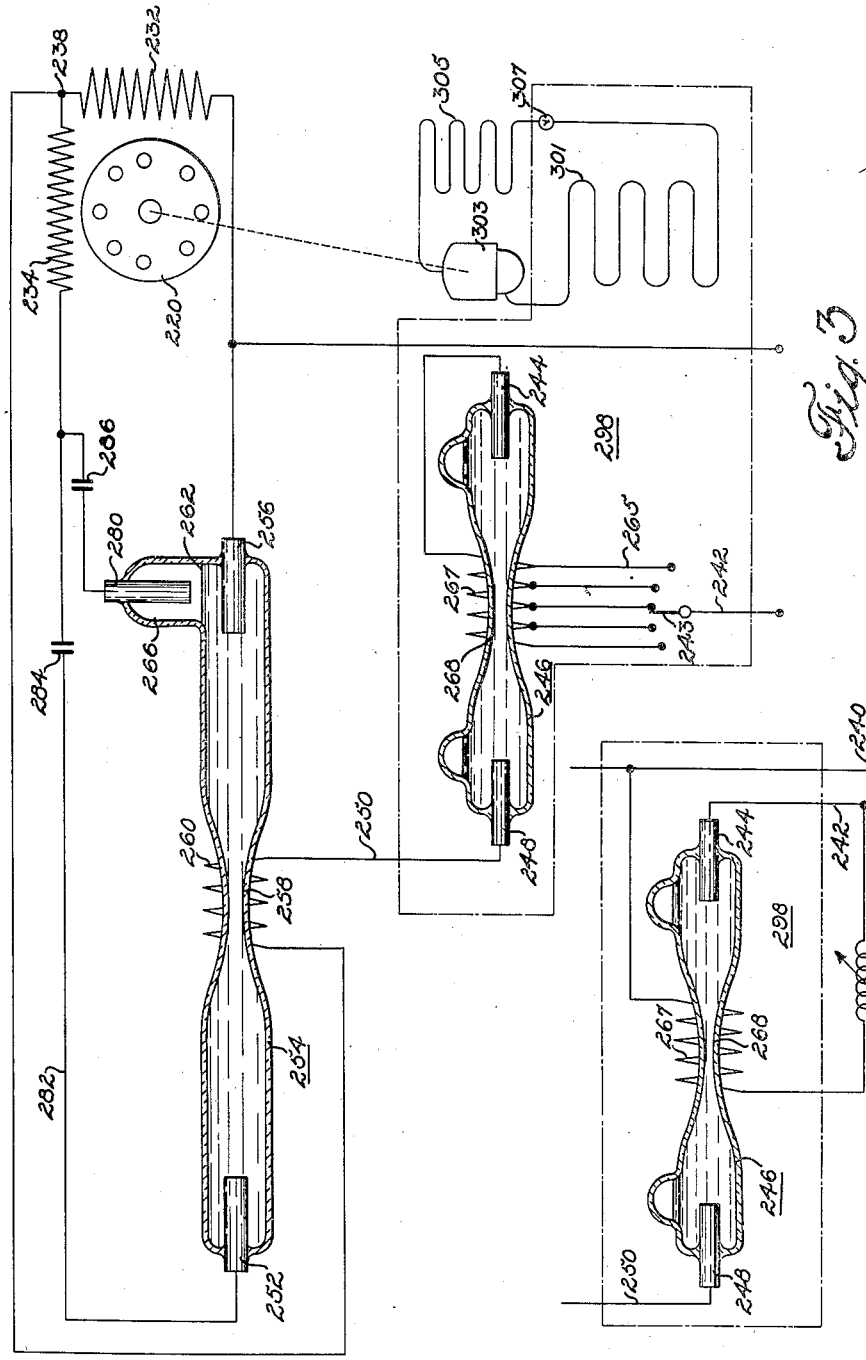
INVENTOR.
Albert O Grooms
BY Spencer Hardman and Fehr
attorneys Patented Apr. 18, 1944

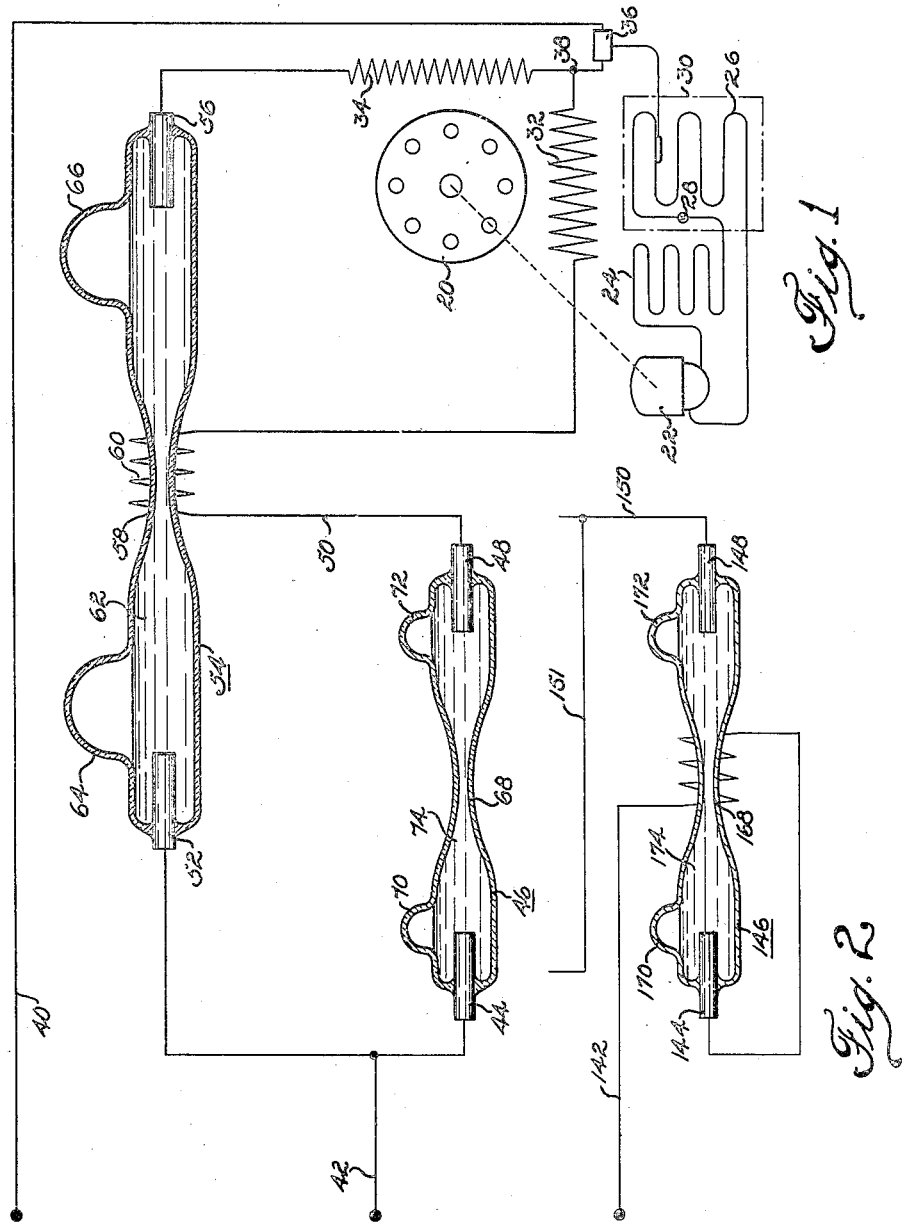

2,346,836

UNITED STATES PATENT OFFICE 2,346,836

ELECTRICAL CONTROL MEANS

Albert C. Grooms, Dayton, Ohio, assignor to General Motors Corporation, Dayton, Ohio, a corporation of Delaware Application November 30, 1940, Serial No. 367,991

8 Claims. (Cl. 172—279)

This invention relates to electric controls and motor control means.

Various schemes have been used for controlling electric motors. In the most of these schemes mechanically operated contact mechanisms are used. Such contacts are subject to deterioration.

It is an object of my invention to provide a starting control for an electric motor which has no mechanical moving parts.

It is another object of my invention to provide an overload control for an electric motor without mechanical moving parts.

It is another object of my invention to provide a temperature control without mechanical moving parts.

It is another object of my invention to provide a trouble-free starting control which will operate uniformly over a great period of time.

It is another object of my invention to provide a trouble-free temperature control which will operate uniformly over a long period of time.

It is another object of my invention to provide a regulating means for controlling the operation of a sealed-tube type of control.

Further objects and advantages of the present invention will be apparent from the following description, reference being had to the accompanying drawings, wherein a preferred form of the present invention is clearly shown.

In the drawings:

Fig. 1 is a view, partly diagrammatic, of one form of my invention applied to an electric motor driving a refrigerating system;

Fig. 2 is a fragmentary view showing a modification of a portion of Fig. 1;

Fig. 3 is a view similar to Fig. 1 showing the invention applied to a capacitor motor and showing one form of the invention used for controlling the motor and the refrigerating system according to the temperature of a refrigerated compartment; and Fig. 4 is a fragmentary view showing another scheme for varying the starting and stopping temperatures.

Briefly, I provide a trouble-free motor control by employing a sealed tube of glass or other suitable material having at least one electrode in each end and a reduced neck portion of a small calibrated cross-sectional area connecting the tube portions provided with electrodes. The tube is filled with a liquid capable of serving as a conductor, which liquid will evaporate when a sufficient heat is generated either by the current flowing through the neck portion or by heat applied to the neck portion. The generation of heat at that point will cause the liquid to evaporate and separate at the neck to stop the flow of electric energy between the electrodes upon opposite sides of the neck. If desired, a third electrode may be provided which will be contacted when the liquid level is raised by the evaporation of some of the liquid at the neck portion.

Referring to the drawings and more particularly to Fig. 1, there is shown an electric motor, generally designated by the reference character 20, which is adapted to be housed in a sealed unit 22 of a compression refrigerating system. This sealed unit 22 also contains a compressor directly driven by the motor 20 for forwarding compressed refrigerant to a condenser 24 where the compressed refrigerant is liquefied and conducted to the evaporator 26 under the control of a suitable valve 28. The refrigerant evaporates under reduced pressure within the evaporator 26 to cool the compartment 30 and the evaporated refrigerant is returned to the compressor through the return conduit.

The motor 20 is of the split phase type including a main winding 32 and a phase or starting winding 34. While the motor 20 is shown as a part of the refrigerating system it should be understood that it may be used for any purpose. The starting and stopping of the motor 20 is controlled by a thermostat switch 36 which connects the common junction 38 of the main and phase windings 32 and 34 with one conductor 40 of the supply source. The other conductor 42 of the supply source is provided with a conductor connecting to an electrode 44 in one end of a sealed tube 46 formed of glass or other suitable material. At the opposite end of the tube 46 there is provided a second electrode 48 which is connected by a conductor 50 to the other end of the main winding 32.

The conductor 42 is also connected to an electrode 52 provided in one end of a sealed tube 54 preferably formed of glass or other suitable material. The opposite end of the sealed tube 54 is provided with an electrode 56 which is connected to the other end of the phase winding 34. This tube 54 is provided with a neck portion 58 between the two electrodes 52 and 56. Preferably this neck portion is reduced to substantially capillary size so that only a calibrated passage of very small cross-sectional area connects the two ends of the tube. The size of this passage mainly determines the starting period of the switch. The conductor 56 has a heater portion 60 which is wrapped around the neck portion 58 so as to apply heat thereto for keeping the electrodes 52 and 56 separated electrically after the starting period. The tube 54, like the tube 46, preferably contains a somewhat volatile liquid 62 which is capable of carrying an electric current without difficulty. For example, mercury may be used or water which is ionized by the addition of a suitable ionizing substance such as a small amount of sodium or other salt or acid. The tube may either be evacuated or it may contain a non-oxidizing gas, such as nitrogen or hydrogen. At opposite ends of the tube above the liquid level there are provided pockets 64 and 66 for receiving the liquid displaced when a portion of the liquid evaporates in the neck portion 58. However, only one pocket is required. The liquid in the portion 58 may evaporate due to the heating effect of the current flowing from the electrode 52 to the electrode 56 through the small passage in the neck 58, or by the heat produced by the heater 60, or both. The bore of the neck of the tube, the liquid used and the amount of heat generated should be such that the liquid is evaporated at the neck 58 in order to open the circuit of the phase winding 34 when the motor reaches approximately full speed. The bore of the neck of the tube is the primary factor in controlling evaporation at that point while the heater portion 60 serves mainly to keep the liquid separated after the motor starts.

The sealed tube 46 likewise is provided with a neck portion 68 and with displacing pockets 70 and 72 upon the top of the tube at either end. Tube 68 is provided with a liquid 74 capable of carrying electric current. This liquid should be so selected that when current sufficient to overheat the main winding 32 flows through the tube that the resistance to flow of electric energy at the neck portion 68 will cause the generation of sufficient heat to evaporate the liquid at that point in order to separate the liquid in the ends of the tube to stop the flow of current. This tube may likewise be either evacuated or charged with a non-oxidizing gas such as nitrogen or hydrogen.

In Fig. 2 a slightly modified arrangement of the overload control tube is shown. In this arrangement, the source conductor 142 is first wrapped around the neck 168 of the tube 146 after which it connects to the electrode 144 at the one end of the tube. At the other end of the tube there is provided an electrode 148 which is connected by a conductor 150 to the main winding of the split phase motor. This conductor 150 is intended to have a heating portion applied to the tube 54 like the heating portion 60. In this modification another conductor 151 is intended to connect to the electrode 52. The tube 146 contains any suitable liquid 174 capable of carrying an electric current and capable of evaporating at the neck portion under the proper conditions to separate the liquid in the two ends of the tube 146.

In Fig. 3 are shown two further developments of my tube-type control applied to a capacitor motor for driving a refrigerating system. In this figure, one source conductor 242 has a rotatable contact member 243 connecting to various taps 265 extending from points on the heating portion 267 wrapped around the neck 268 of a sealed glass tube 246, having an electrode 244, at one end connected to the heating portion 267. At the other end, there is provided an electrode 248 connected to a conductor 250 having a heating portion 260 wrapped around the neck portion 258 of a sealed glass tube 254. This conductor 250 extends to the common junction 238 between the main winding 232 and the phase winding 234 of a capacitor type motor 220.

The sealed tube 254 differs somewhat from the sealed tube 54 of Fig. 1 in that it is provided with a third electrode 280 located in the displacement space 266 at one end of the tube above the normal liquid level therein. No displacement space is provided at the opposite end of the tube where the first electrode 252 is located below the liquid level. At the opposite end of the tube, the second electrode 256 is located below the liquid level. The tube 254 contains a liquid capable of carrying electric current sufficiently volatile to evaporate when sufficient heat is applied. This liquid has a normal liquid level 262 normally located just below the bottom of the electrode 280. When sufficient heat is generated at the neck portion 258 of the tube 254 a portion of the liquid will evaporate at this point and the liquid level in the displacement space 266 will rise sufficiently to contact the lower end of the electrode 280. This will cause the separation of the electrodes 252 and 256 and the joining of the electrode 256 with the electrode 280.

The electrode 252 is connected by conductor 282 with a capacitance means 284 having a capacitance selected for starting purposes. This capacitance means 284 is connected to one end of the phase winding 234. The electrode 280 is connected to the capacitance means 286 which has a capacitance selected for normal running of the motor. If desired, however, the electrodes 252 and 280 may connect to suitable taps upon a transformer employed to vary the capacitive reactance of the capacitance means connected to the phase winding 234. The electrode 256 as well as the other end of the main winding 232 are connected to the source conductor 240.

The tube 246 is located within the compartment 298 which is cooled by an evaporating means 301 of a refrigerating system which includes a sealed unit compressor 303 which withdraws evaporated refrigerant from the evaporator 301 and forwards the compressed refrigerant to a condenser 305 from which liquid refrigerant returns to the evaporating means 301 under the control of a suitable flow control device 307. The capacitor motor 220 is preferably located in the sealed unit 303 and connected directly to the compressor therein. Since the air within the compartment 298 circulates, the tube 246 not only will be responsive to the temperature of the air therein but will likewise be responsive to the temperature of the evaporator 301.

In addition to the electrical conducting liquid, the tube 246 preferably contains a small amount of a second volatile liquid which will evaporate at a lower temperature and preferably will evaporate substantially at the temperature at which it is desired to maintain the air in the compartment 298. For example, tetrafluorodichloro ethane (F-114) having a boiling point of 39° F. may be used if desired. This second volatile liquid will make it possible for the tube 246 to operate as a thermostat as well as an overload control.

When the temperature within the compartment 298 is above normal, the second volatile liquid will create sufficient pressure within the tube 246 to condense all of the conducting liquid to close the motor circuit and start the operation of the refrigerating system. As the compartment 298 cools, the pressure of the second volatile liquid will be reduced, allowing the electrical conducting liquid to evaporate in the neck portion 268 of the tube 246 when the compartment 298 reaches a predetermined low temperature.

Should there be an excessive amount of current flowing through the heater portion 267 and the tube 246, the heat generated thereby will be sufficient to evaporate the conducting fluid at the neck portion 268 to break the circuit between the electrodes 244 and 248 regardless of the temperature and pressure of the second volatile liquid in the tube 246.

The rotatable contact member 243 may be moved from any one of the taps 265 to any other in order to vary the effective length of the heating portion 267. This will vary the amount of heat generated by the heating portion 267 and thereby will vary or change the temperature at which the liquid in the tube 246 is joined and separated to close and open the motor circuit.

When the motor starts the current will flow through the conductor 242, the rotatable contact member 243, one of the taps 265, the heating portion 267, electrode 244, the sealed glass tube 246, the electrode 248, the conductor 250 and the heater 260 to the common junction 238. Current will also flow from the source conductor 240 to the main winding 232 as well as to the electrode 256. From the electrode 256 current will flow through the tube 254 to the electrode 252 and through the conductor 282 to the capacitance means 284 for energizing the phase winding 234 for starting purposes. Heat will normally be generated at the neck 258 by the heater 260 as well as the current flowing through the tube 254 and when the motor approaches running speed the liquid will evaporate in the neck 258 to separate electrode 252 from the electrode 256 and cause the electrode 280 to be contacted by the electrolyte. This will break the current to the capacitance means 284 and cause the current to flow from the electrode 280 to the capacitance means 286 and the phase winding 234 for the running period. If desired this tube 252 may be used to vary the capacitance applied by other means such as a transformer.

The motor will be stopped when the tube 246 is cooled sufficiently by the air in the compartment 296 to enable the heat generated at the neck portion 268 to cause evaporation at that portion to break the circuit between the electrodes 244 and 248 to stop the motor.

In Fig. 4, there is shown another scheme for controlling the heat applied to the neck of the tube 246. In this scheme a variable or adjustable resistance 296 is connected in series with the heating portion 267 across the supply conductors 240 and 242. The adjustment of the variable resistance 296 will change the amount of heat generated at the neck portion of the tube 246 and thus will change the temperature at which the liquid is joined and separated in the tube 246.

While the form of embodiment of the invention as herein disclosed, constitutes a preferred form it is to be understood that other forms might be adopted, all coming within the scope of the claims which follow.

What is claimed is as follows:

1. In combination, an electric motor having main and phase windings, a control for changing the energization of the phase winding comprising a sealed container of electrical insulating material, said container having a capillary portion providing a connecting fluid passage of small cross-sectional area between the other portions of the container, said container being provided with an electrode upon either side of the capillary portion, one of said electrodes being connected to one end of the phase winding and the other to a source of electrical energy, means connecting the other end of the phase winding and both ends of the main winding to said source, said container containing an electrical conducting liquid sufficiently volatile to form a vapor barrier when heat is applied at the neck portion, and means for preventing the breaking of the vapor barrier during the remainder of each operating period of the motor following the change in the energization of the phase winding including means for heating said capillary portion coincidentally with the energization of the main winding.

2. In combination, an electric current control including a sealed container containing an electrical conducting liquid, said container having a vapor retaining connecting portion of electrical insulating material providing a connecting fluid passage of small cross-sectional area, said container being provided with an electrode upon each side of the connecting portion, said electrodes being connected to conductors, said conducting liquid being sufficiently volatile to evaporate and separate electrically said electrodes when sufficient heat is generated at said connecting portion, said sealed container containing a second volatile liquid for creating a vapor pressure affected by environment temperature for varying the current breaking point.

3. In combination, a capacitor type electric motor having main and phase windings and capacitance means, a control for controlling the connection of said capacitance means to the phase winding, comprising a sealed container containing an electrical conducting liquid, said sealed container having a capillary portion providing a connecting fluid passage of small cross-sectional area, said sealed container having a space on one side of the capillary portion above the normal liquid level and a first electrode in said space so located that it will be contacted by the liquid when the liquid is forced out of the connecting fluid passage, said container also having second and third electrodes located below the liquid level on opposite sides of said capillary portion, the walls of said container including insulating means for insulating said electrodes from each other and from said capillary portion, means connecting said first and one of the second and third electrodes to said capacitance means for changing the connection of the capacitance means to the phase winding for changing the effective value of capacitance applied to the phase winding, means connecting the other electrode and the windings to the source of energy, the last named means including connections from the capacitance means to the phase winding and from the latter to the source of energy, and means for heating the capillary portion coincidentally with the energization of the main winding.

4. In combination, an electric current control including a sealed container containing an electrical conducting liquid, said container having a vapor retaining connecting portion between two reservoir portions of the container providing a connecting fluid passage of small cross-sectional area, said electrical conducting liquid extending through said connecting portion to said two reservoir portions partially filling one of said reservoir portions to a certain level, said one reservoir portion being provided with one electrode extending below the liquid level and a second electrode located entirely a small distance above the normal liquid level, said container being provided with a third electrode on the opposite side of the connecting portion extending below the liquid level of the reservoir portion, said container being provided with means for insulating the electrodes from each other and from the connecting portion, said conducting liquid being sufficiently volatile to evaporate and separate electrically at the connecting portion and to contact said second electrode when sufficient heat is generated at the connecting portion.

5. In combination, an electric motor having main and phase windings, a plurality of capacitance means, means for connecting one terminal of each capacitance means together and with the phase winding, a control for changing the energization of said capacitance means comprising a sealed container containing an electrical conducting liquid, said sealed container having a connecting portion providing a connecting fluid passage of small cross-sectional area, said sealed container having a space on one side of the connecting portion above the normal liquid level and having a first electrode in said space so located that it will be contacted by the liquid when the liquid is forced out of said connecting fluid passage, said container also having second and third electrodes located below the liquid level on opposite sides of said connecting portion, the walls of said container including insulating means for insulating said electrodes from each other and from the middle of said connecting portion, means connecting said first electrode with the other terminal of one of said capacitance means, means connecting the electrode located below the liquid level upon the opposite side of the connecting portion from said space with the other terminal of another of the capacitance means, means connecting one side of the power source with an electrode located below the liquid level on the same side of said connecting portion as said first electrode and one end of the main winding, means connecting the common junction between the main and phase windings with the other side of the power source, and means for heating the connecting portion coincidentally with the energization of the main winding.

6. In combination, an electric motor having main and phase windings, means for energizing said windings including a power source connected to the windings and control means connected between the power source and the phase winding for changing the energization of said phase winding at the end of the starting period comprising a sealed container containing a volatile conducting liquid, said container having a liquid separating vapor retaining portion located at least in part below the normal liquid level of the conducting liquid for separating the liquid upon the accumulation of sufficient vapor and a set of electrodes insulated from one another projecting into said volatile liquid on opposite sides of said vapor retaining portion, one of said electrodes being connected to the power source and the other to the phase winding, said control means including means for supplying heat to the portion of said liquid adjacent the vapor retaining portion during the starting period of the motor so as to form a vapor barrier in said vapor retaining portion at the end of the starting period to change the energization of the phase winding and for supplying heat during the remainder of the operating period of the motor to maintain said vapor barrier to keep changed the energization of the phase winding.

7. In combination, a capacitor type motor having main and phase windings and capacitor means connected to the phase winding, said capacitor means having a plurality of connections providing different values of capacitance, means for energizing said main and phase windings and said capacitor means comprising a power source connected to said windings and a control means connected to said power source and capacitor means for changing the energization of the capacitor means and the phase winding including a sealed container containing a volatile electrical conducting liquid, said container having a liquid separating vapor retaining portion located at least in part below the normal liquid level of the conducting liquid for separating the liquid upon the accumulation of sufficient vapor and a set of electrodes insulated from one another projecting into said volatile liquid on opposite sides of said vapor retaining portion, one of said electrodes being connected to the power source and the other to one of the connections of the capacitor means, said container having another electrode connected to another connection of the capacitor means to provide a changed energization of the capacitor means and located above the normal liquid level at a point so as to be contacted by a rise in liquid level resulting from the formation of a vapor barrier in the vapor retaining portion, said control means including means for supplying heat to the portion of said liquid adjacent the vapor retaining portion during the starting period of the motor to form a vapor barrier in said vapor retaining portion at the end of the starting period and for supplying heat during the remainder of the operating period of the motor to maintain said vapor barrier to keep changed the energization of the phase winding.

8. In combination, an electric current control including a sealed container containing an electrical conducting liquid, means for heating said liquid to change the ratio between the liquid and gas phases thereof, a set of electrodes in said container located so as to be bridged and unbridged by the liquid according to the change in ratio of said liquid and gas phases, said sealed container containing a second volatile liquid for creating a vapor pressure affected by environment temperature for varying the current breaking point.

ALBERT O. GROOMS.